(12) United States Patent
Austin

(10) Patent No.: US 6,259,908 B1
(45) Date of Patent: Jul. 10, 2001

(54) METHOD OF LIMITING ACCESS TO THE DATA STORED IN A CELLULAR TELEPHONE

(75) Inventor: Mark Austin, Atlanta, GA (US)

(73) Assignee: Bellsouth Intellectual Property Management Corporation, Atlanta, GA (US)

( * ) Notice: Subject to any disclaimer, the term of this patent is extended or adjusted under 35 U.S.C. 154(b) by 0 days.

(21) Appl. No.: 08/756,017

(22) Filed: Nov. 25, 1996

(51) Int. Cl.[7] .................. H04Q 7/22; H04Q 7/32
(52) U.S. Cl. ............................................. 455/411
(58) Field of Search ........................... 455/410, 411, 455/418, 419

(56) References Cited

U.S. PATENT DOCUMENTS

| | | | |
|---|---|---|---|
| 5,077,790 | 12/1991 | D'Amico et al. | 380/23 |
| 5,214,743 | 5/1993 | Asai et al. | 706/31 |
| 5,754,953 | * 5/1998 | Briancon et al. | 455/418 |
| 5,828,956 | * 10/1998 | Shirai | 455/411 |
| 5,864,757 | * 1/1999 | Parker | 455/418 |

* cited by examiner

Primary Examiner—Andrew M. Dolinar
(74) Attorney, Agent, or Firm—Kilpatrick Stockton LLP

(57) ABSTRACT

A method of limiting access to data of a cellular telephone. The method of limiting access may be accomplished by defining in the cellular telephone a subsidy lock code for use in activating the cellular telephone on the designated cellular network. The step of defining occurs before the cellular telephone is activated on a cellular network. The subsidy lock code is defined in manner that prevents the subsidy lock code from being erased using the keypad of the cellular telephone. When procedures are initiated by an entity for activating the cellular telephone on the cellular network, the entity must demonstrate knowledge of the subsidy lock code. Upon demonstration of knowledge of the subsidy lock code, the cellular telephone may be activated on the cellular network by the entity.

6 Claims, 5 Drawing Sheets

METHOD OF LIMITING ACCESS TO THE DATA STORED IN A CELLULAR TELEPHONE

FIELD OF THE INVENTION

The present invention generally relates to the field of cellular telephones and, in particular, to the field of limiting access to the data stored in a cellular telephone. Even more particularly, the present invention relates to the field of limiting activation of a cellular telephone to a designated telecommunications network.

BACKGROUND OF THE INVENTION

The communication industry is rapidly changing and is offering a wide variety of new products and services. The number of different services available to customers continues to grow at a very rapid pace. The growth includes improvements in telephone equipment and communication systems. For example, in recent years, public use of wireless communication devices has significantly increased. Specifically, the purchase and use of cellular telephones has become commonplace. A cellular telephone may be generally defined as a mobile telephone that uses wireless communication to communicate to other devices. The cellular telephone communicates through a transmitter/receiver of a plurality of transmitters/receivers. The transmitter/receiver used for communication depends on the location of transmitter/receiver or signal strength of the transmitter/receiver with respect to the cellular telephone.

In previous decades, most cellular telephones were used by business people who worked away from their offices on a regular basis. However, today, many people use cellular telephones for convenience and for emergency purposes not associated with a business. The growth of the cellular industry has contributed to increased competition in the industry. Consequently, cellular service carriers have sought to reduce cost associated with rendering cellular service in order to provide competitive prices for cellular service. Also, cellular service carriers desire to reduce the number of unauthorized users of cellular service. Cellular service carriers are unable to collect service fees from unauthorized users because the unauthorized users are difficult to locate and are not contractually bound to pay service fees. Unauthorized use of cellular telephones is a potential source of lost income for the cellular service carriers.

In addition to the goals of reducing cost associated with providing cellular telephone service and preventing unauthorized use of cellular telephones, cellular service carriers desire to reduce the purchase cost of cellular telephones to potential customers. Reducing the cost of cellular telephones to potential customers helps to make the cellular telephones more affordable and thus may provide incentive for the potential customers to buy cellular telephones. In recent years, cellular telephones have been manufactured with operating features identical to those found in conventional telephones. Such operating features include storage and recall of numbers in memory, voice mail and call blocking. In order to provide such features, cellular telephones use digital circuits that are intelligently programmed to provide the multiple features. Due to cellular telephone mobility, cellular telephones must be light and compact. To meet the requirements of size and multiple features, a cellular telephone is constructed with sophisticated circuits that maximize the minimal space available within the cellular telephones. Due to the size and complexity of circuits designed for the cellular telephones, cellular telephones can be expensive. The expense of cellular telephones may preclude or discourage potential purchasers from buying cellular telephones. To increase the customer base in light of expensive cellular telephones, cellular service carriers help to reduce the cost of purchasing cellular telephones to potential customers by subsidizing the cost of cellular telephones.

A cellular service carrier may subsidize the cost of a cellular telephone by purchasing cellular telephones directly from manufacturers at a cost of $200 to $300 each and then selling the telephones to a retailer for less than $10 each. Thus, the retailer may sell the telephones at low cost to customers. To ensure that the customers are set up on the cellular network of the subsidizing cellular service carrier, the subsidizing cellular service carrier enters into a contract with the retailer. The contract requires the retailer to set up the purchased subsidized cellular telephone on the cellular network of the subsidizing cellular service carrier. If a subsidized cellular telephone is not set-up on the subsidizer's network, the subsidizer has no way of recouping the subsidized amount through service fees. Ensuring activation of a subsidized cellular telephone on the subsidizer's cellular network is thus very important to the subsidizing cellular service carrier.

To program a cellular telephone for use on a cellular network, a retailer is employed to contact a system administrator in a customer activation center associated with the subsidizer to activate the cellular telephone on the subsidizer's cellular network. Typically, the subsidizer pays a substantial commission to its retailers for finding customers and for performing the programming and activation tasks. The expense incurred by a cellular service carrier that is attributable to paid commissions may be passed on as increased service fees to the customer of the cellular telephone or may decrease the profit of the cellular service carrier.

Due partially to the expense associated with paying retailers commissions on the sales of cellular telephones, the cost of cellular telephones remains high. This high cost can be reduced by by-passing the retailer/programmer in the chain of distribution of cellular telephones. By-passing the retailer/programmer can be accomplished by supplying subsidized cellular telephones in large retail chain stores. However, if a subsidized cellular telephone is made generally available as any other product in the retail chain store, no retailer/programmer is available to ensure that a subsidized cellular telephone is set up on the cellular network of the subsidizing cellular service carrier.

Cellular service carriers have not provided a method of ensuring activation of a subsidized cellular telephone made available for general purchase at a retailer to the subsidizer's network.

Another problem encountered when programming cellular telephones is the "person-in-the-middle" problem. The "person-in-the-middle" problem occurs during activation of the cellular telephone. A "person-in-the-middle" may monitor the airways to determine when a cellular phone is being activated. When the "person-in-the-middle" determines that a cellular telephone is being activated on a network, the "person-in-the-middle" may intercept all messages from the programming base station to the cellular telephone. The "person-in-the-middle" may use a higher power to transmit signals to the cellular telephone. Therefore, the "person-in-the-middle" may prevent the base station from communicating directly with the cellular telephone. With the information obtained during the signal transmissions, the "person-in-the middle" may reproduce the information contained in the cellular telephone in another cellular telephone to create a clone of the cellular telephone. The clone could be used without authorization on a cellular network. This unauthorized use may generate significant problems such as unauthorized service fees, extra burdens to the cellular network, etc.

Thus, there is a need in the art to prevent unauthorized access to data of a cellular telephone. There is also a need in the art for a method of limiting, without the aid of a third party, activation of cellular telephones to a designated cellular network. There is also a need in the art for a method of preventing an interceptor of cellular telephone activation signals from obtaining information that enables the interceptor to clone the cellular telephone being activated.

SUMMARY OF THE INVENTION

The present invention generally relates to a method of limiting activation of a cellular telephone to a designated cellular network.

More particularly, limiting access to a designated cellular network may be accomplished by defining in a cellular telephone a subsidy lock code for use in activating the cellular telephone on the designated cellular network. The subsidy lock code is defined before the cellular telephone is activated on a cellular network. When procedures are initiated with an entity for activating the cellular telephone on the designated cellular network, the method of the present invention requires the entity to demonstrate knowledge of the subsidy lock code. Upon demonstration of knowledge of the subsidy lock code, the method of the present invention enables activation of the cellular telephone on the designated cellular network.

Advantageously, the subsidy lock code defined by the present invention limits, without the aid of a third party, activation of cellular telephones to a designated cellular network, and prevents an interceptor of cellular telephone activation signals from obtaining information that would enable the interceptor to clone the cellular telephone being activated.

In another method of the present invention, a cellular telephone having a keypad, a controller circuit for controlling the operations of the cellular telephone and a memory for storing data is used. This method limits access to the data of the cellular telephone. A first memory location is defined in the cellular telephone for storing a data configuration lock code. The data configuration lock code prevents unauthorized over-the-air access to data stored in the cellular telephone. A second memory location also is defined in the cellular telephone for storing a subsidy lock code. The subsidy lock code limits over-the-air activation of the cellular telephone to a designated cellular network. The subsidy lock code is not changeable from the keypad of the cellular telephone. The cellular telephone is enabled to select the data configuration lock code or the subsidy lock code. Upon selection by the cellular telephone of the data configuration lock code or the subsidy lock code, an entity seeking to access data of the cellular telephone is required to demonstrate knowledge of the data configuration lock code or the subsidy lock code as selected by the cellular telephone. Upon demonstrating knowledge of the data configuration lock code or the subsidy lock code, the cellular telephone is enabled to be activated on the designated cellular network.

Additional steps may be included in the method of the present invention. An additional step of the method may include determining whether the data configuration lock code or the subsidy lock code is equal to a value that indicates respectively that the data configuration lock code or the subsidy lock code is not to be selected. Another step may include determining whether the subsidy lock code is equal to the value prior to enabling determination of whether the data configuration lock code is equal to the value. Another step may include defining a third memory location in the cellular telephone for storing a value that indicates the data configuration lock code or the subsidy lock code should be selected by the cellular telephone.

Another method of the present invention prevents unauthorized activation of a cellular telephone on a cellular network. One step of this method includes determining the electronic serial number of the cellular telephone. A second step of the method includes providing a identification code associating the cellular telephone with a selected cellular service carrier. A third step of the method includes combining the electronic serial number and the predetermined code. When the electronic serial number is combined with the identification code, a subsidy lock code is formed that associates the cellular telephone with the selected cellular service carrier. The subsidy lock code is stored in the cellular telephone and is operative for use in activating the cellular telephone on the cellular network. The subsidy lock code is not erasable by using the keypad of the cellular telephone.

The method may additionally include activating the cellular telephone on the cellular network if the subsidy lock code corresponds to a second activation lock code generated by the selected cellular service carrier.

Thus, it is an object of the present invention to provide a method of limiting activation of a cellular telephone to a designated cellular network.

It is also an object of the present invention to prevent unauthorized access to data of a cellular telephone.

It is another object of the present invention to provide an activation lock that limits over-the-air activation of a cellular telephone to a designated service carrier.

These and other objects, features, and advantages of the present invention will become apparent from reading the following description in conjunction with the accompanying drawings.

DETAILED DESCRIPTION

Figure 1:
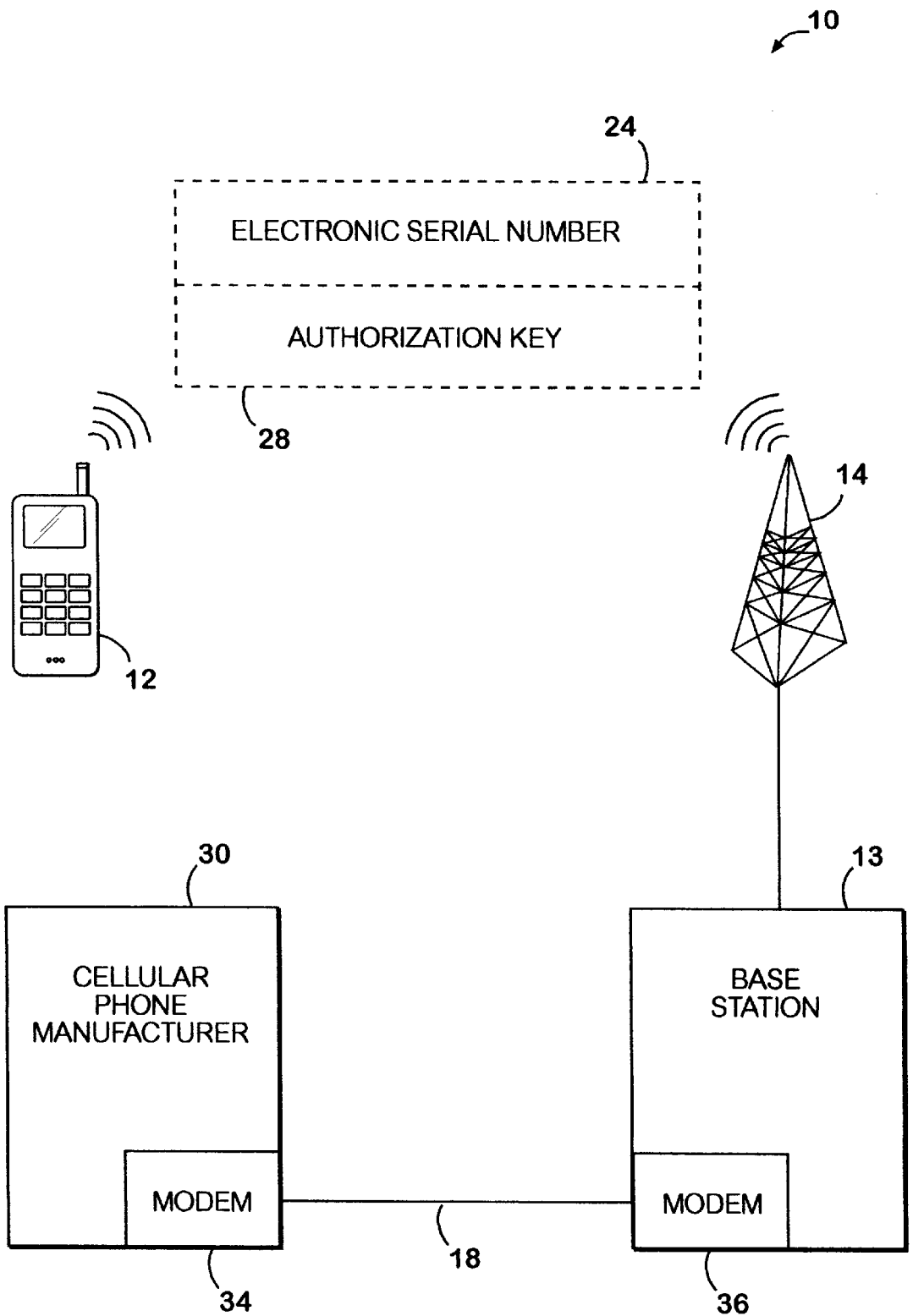
FIG. 1 illustrates a cellular network in which a cellular telephone operating in accordance with the present invention may be used.
Figure 2:
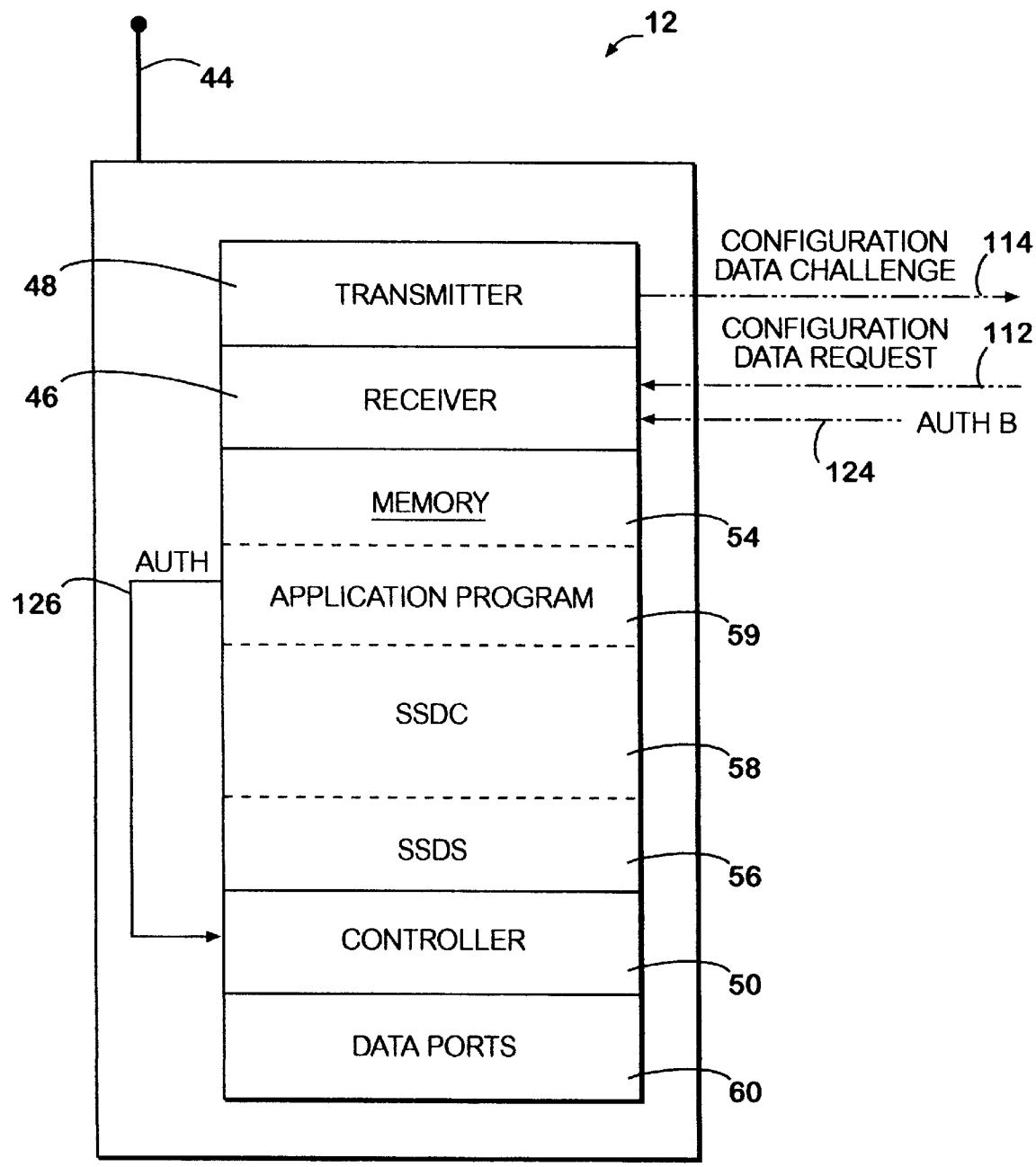
FIG. 2 is a block diagram of a cellular telephone constructed according to the preferred embodiment of the present invention.
Figure 3:
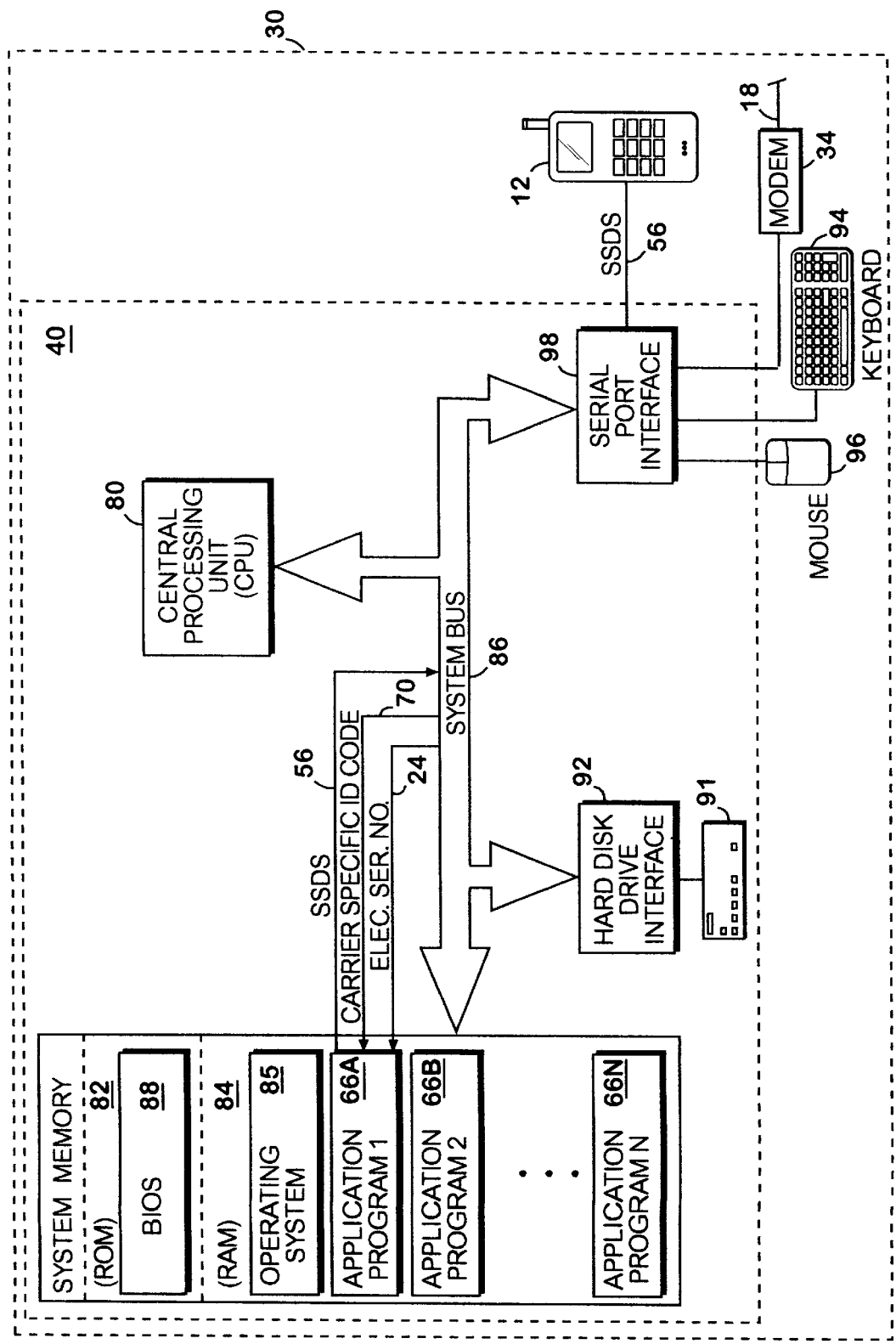
FIG. 3 is block diagram of a computer system that may be used to program the cellular telephone illustrated in FIG. 2.
Figure 4:
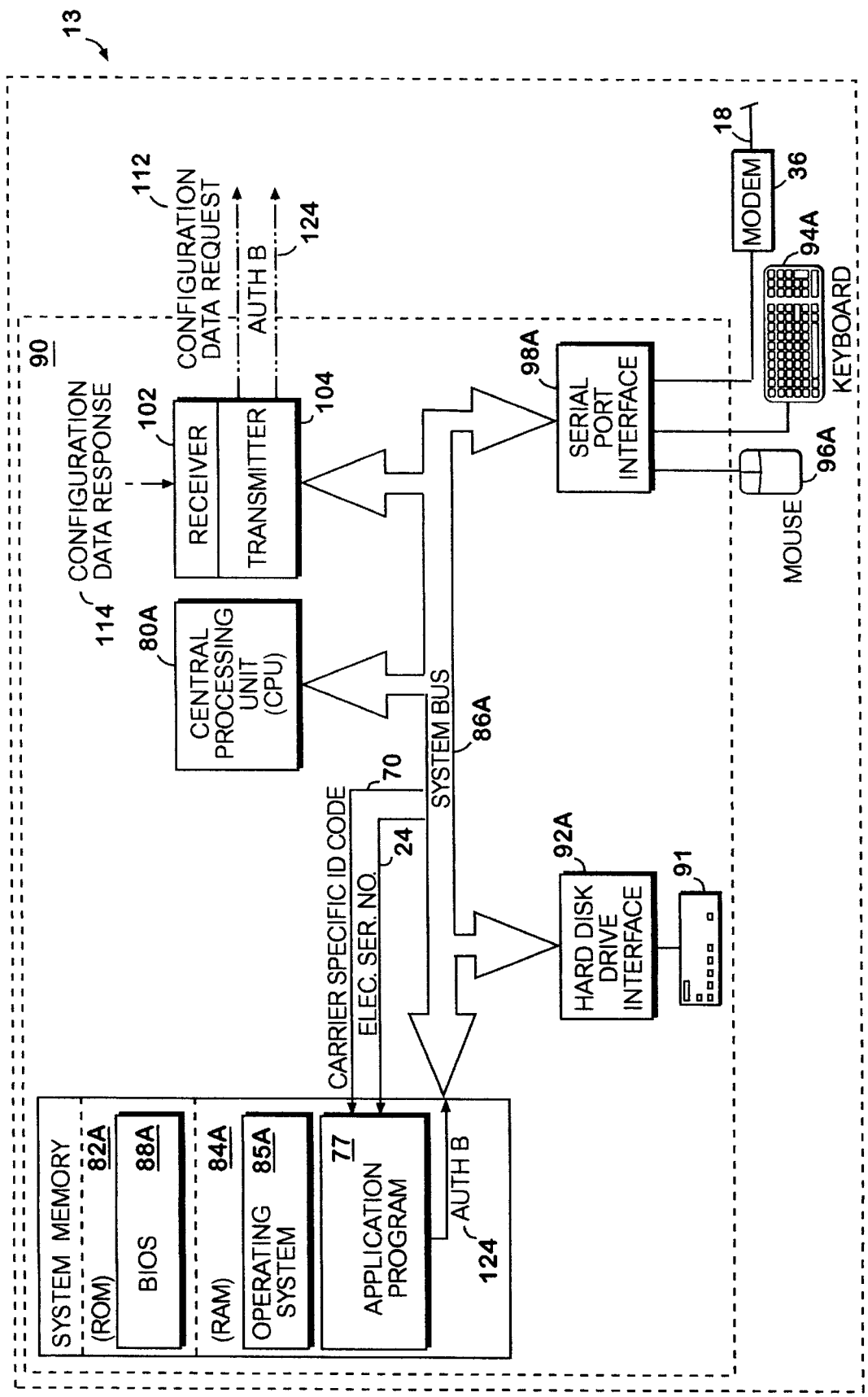
FIG. 4 is block diagram of a computer system that may be used to interact with the cellular telephone of FIG. 2 to activate the cellular telephone.
Figure 5:
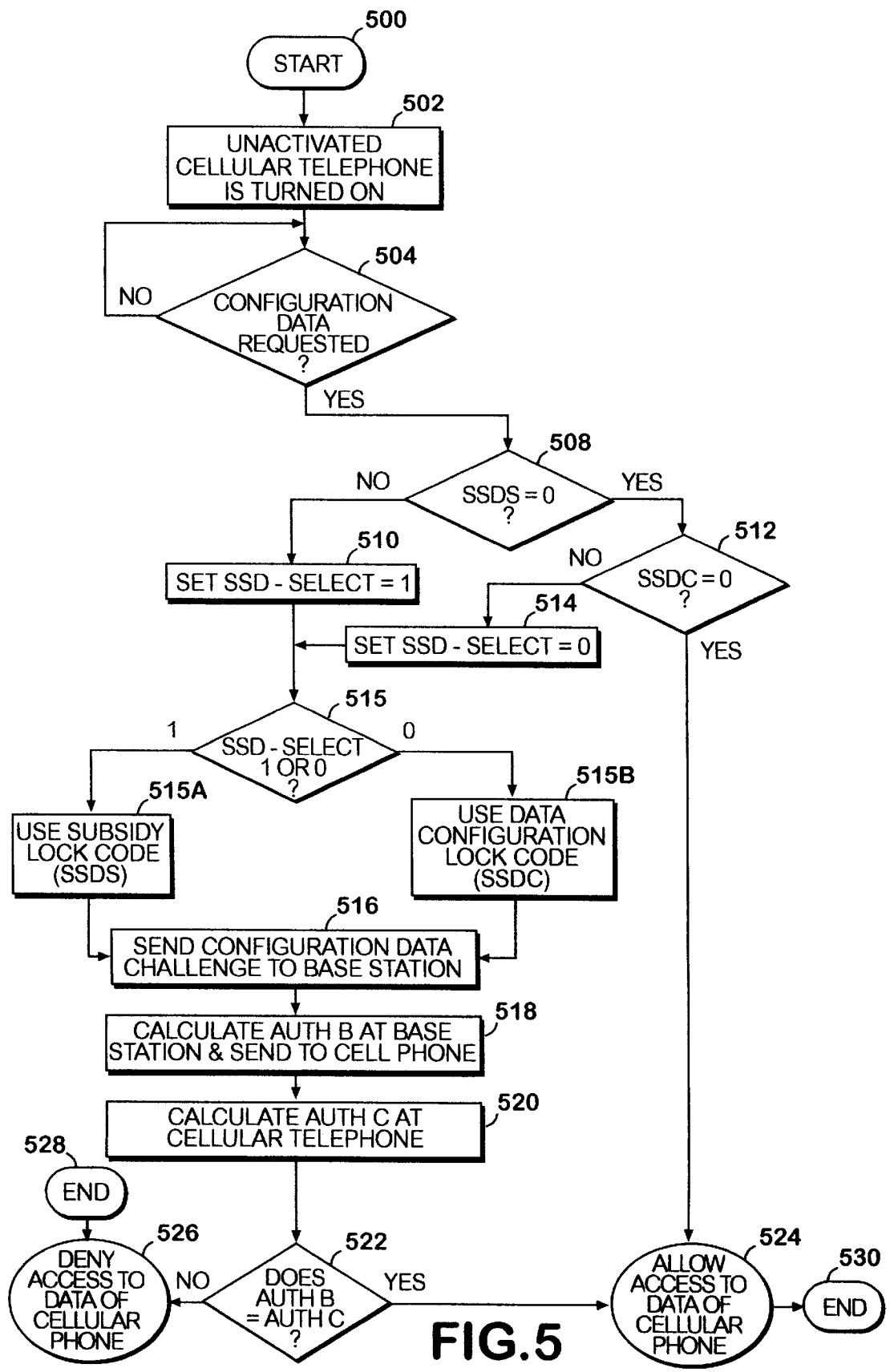
FIG. 5 is a flow diagram showing the steps of the preferred embodiment of the present invention for activating the cellular telephone of FIG. 2.

Turning next to the figures in which like numerals indicate like parts, the preferred embodiment of the present invention is described. The present invention provides a method of limiting access to the data stored in a cellular telephone. By limiting such access, the present invention also provides a method of limiting activation of a cellular telephone to a designated telecommunications network. In particular, the present invention preferably limits access to the data to an entity that demonstrates certain knowledge. The description of the preferred embodiment of the present invention is discussed in detail with reference to the figures. FIG. 1 illustrates the general components that interact during the operation of the preferred embodiment. FIGS. 2, 3, and 4 illustrate in more detail the general components of FIG. 1. FIG. 5 illustrates the preferred process of the present invention in more detail.

Referring to FIG. 1, the basic operation of the components and associated devices of a cellular network 10 is discussed. The cellular network 10 includes a base station 13 that utilizes a broadcast antenna 14 for transmitting radio frequency signals to a cellular telephone 12 and for receiving radio frequency signals from the cellular telephone 12. Those skilled in the art will appreciate that a mobile switching center (not shown) is generally connected to the base station 13. As known to those skilled in the art, the mobile switching center tracks and switches a cellular telephone from cell site (transmitter/receiver) to cell site as the cellular telephone passes through various cell sites. The base station 13 is further connected to a customer activation center (not shown). The customer activation center may handle certain aspects of processing information during activation of the cellular telephone with a cellular service carrier. A customer activation center generally handles customer inquiries, service updates, and initial service activations. As used herein, only the base station 13 will be referred to as handling the activation functions in connection with activating the cellular telephone 12.

The preferred process for activating the cellular telephone 12 on the cellular network 10 is now generally discussed. When an entity detects and attempts to activate the cellular telephone 12, the cellular telephone 12 challenges the entity. A challenge is defined as a request from the cellular telephone to the entity to demonstrate knowledge of information, and preferably, to demonstrate knowledge of information that is stored in the cellular telephone or which the cellular telephone determines as part of the request/challenge process. An entity may be defined as a cellular service provider operating through base station 13. The activation attempt or the challenge need not be limited to "over-the-air" procedures in the cellular network, but may occur in other manners well known to those skilled in the art. In accordance with the preferred embodiment, the cellular telephone 12 challenges the base station 13 to demonstrate knowledge of a subsidy lock code (SSDS). The subsidy lock code is defined and stored in the cellular telephone in a manner that prevents the subsidy lock code from being erased from the cellular telephone 12 via the keypad of the cellular telephone 12.

In response to the challenge from the cellular telephone, the base station 13 preferably demonstrates knowledge of the subsidy lock code by transmitting an authorization key 28 to the cellular telephone 12. The authorization key is based on information that is transmitted from the cellular telephone to the base station as part of the challenge. This information preferably includes the electronic serial number (ESN) of the cellular telephone and a random number. To determine the authorization key, the base station retrieves a subsidy lock code that corresponds to the cellular telephone. For example, this correspondence may be based on the ESN of the cellular telephone. The subsidy lock code may be retrieved from a database, table, etc. Alternatively, the subsidy lock code may be retrieved through a process that includes a carrier specific algorithm which uses information such as the ESN provided as part of the challenge so as to identify the cellular telephone. Once the subsidy lock code is retrieved by the base station 13, it is encrypted to form the authorization key and transmitted to the cellular telephone. The cellular telephone compares the authorization key received from the base station with an authorization key that the cellular telephone has stored or preferably has determined. The cellular telephone preferably determines its authorization key based on processing the subsidy lock code with other information such as through the use of an encryption computer program. The cellular telephone then carries out a comparison function. If the authorization key stored or generated at the cellular telephone matches the authorization key received from the base station, then the base station 13 has demonstrated knowledge of the subsidy lock code. The base station 13 then is allowed access to the data of the cellular telephone, and to activate the cellular telephone 12 on the cellular network 10. If, however, the base station 13 does not demonstrate knowledge of the subsidy lock code, the base station 13 is not allowed access to the data of the cellular telephone. Nor is the base station allowed to activate the cellular telephone 12 on the cellular network 10.

Structure of the Preferred Embodiment of the Cellular Telephone

Referring to FIG. 2, a block diagram of the cellular telephone 12 designed in accordance with the preferred embodiment of the present invention is illustrated. Those skilled in the art will recognize that the cellular telephone may be any of a wide variety of wireless personal communication devices, including personal communicators and personal digital assistants which have cellular telephone capability. In FIG. 2, the basic components of the cellular telephone 12 that are used in conjunction with the present invention are discussed. Specifically, the preferred memory locations and the codes or data that are used to limit access to the data of a cellular telephone and to limit activation of the cellular telephone to a designated cellular network 10 are defined and discussed. The cellular telephone 12 preferably has an antenna 44, a receiver 46, a transmitter 48 for communicating with a base station 13 (FIG. 1), and a controller 50 for controlling the operations of the cellular telephone 12. Data ports 60 receives input from external devices and transmits output to external devices. The controller 50 may include a microprocessor (not shown) and other related circuits, known to those skilled in the art.

The cellular telephone 12 also has a memory 54 for storing application programs and data. The memory 54 may include a random access memory (RAM) and a read only memory (ROM), not shown separately. In accordance with the preferred embodiment, the memory 54 of the cellular telephone 12 has defined therein a memory location for storing a subsidy lock code (SSDS) 56.

As known to those skilled in the art, cellular telephones have functions and data that may be changed or reprogrammed from the keypad of the cellular telephone. The memory location containing the subsidy lock code 56 is defined in a manner that prevents the subsidy lock code 56 from being changed or reprogrammed by using the keypad of the cellular telephone 12. The manner of defining a code to prevent changing or reprogramming from the keypad is known by those skilled in the art. The reprogramming or changing of a code in memory is often referred to as erasing or referred to as "zeroing-out" when a zero value is reprogrammed into the memory location. With zeroing-out, the code cannot be changed to a non-zero value by over-the-air programming. By defining the subsidy lock code 56 in a manner that prevents it from being reprogrammed or changed from the keypad, a computer hacker or other entity cannot erase the subsidy lock code 56 and use the cellular telephone with an unauthorized cellular network.

Preferably, a data configuration lock code (SSDC) 58 also may be stored in a cellular telephone. Generally, the data configuration lock code 58 is used to prevent access to data in the cellular telephone 12, but after the cellular telephone has been activated. The data configuration lock code 58 is erasable from the keypad of a cellular telephone and therefore does not provide a secure mechanism for preventing unauthorized activation of or tampering with a cellular telephone. Erasing the data configuration lock code 58 by using the keypad enables the cellular telephone to be activated on a cellular network that is not designated for use with the cellular telephone. The use of the data configuration lock code 58 in connection with the subsidy lock code 56 in the preferred embodiment is discussed in detail in connection with FIG. 5.

The subsidy lock code (SSDS) 56 and the data configuration lock code (SSDC) 58 may both be used as part of a data restriction process at any time during the life of the cellular telephone 12. However, it may be preferable to use the subsidy lock code 56 only once, that is for a single purpose. This single purpose may be the initial activation of the cellular telephone 12 to ensure that the cellular telephone 12 activates on the cellular network of the subsidizing cellular service carrier. After this initial activation, the cellular service provider or cellular network has most likely received its subsidy and could retain the subscriber through a contract. After this initial activation, the cellular service carrier or cellular network may choose to "zero-out" the subsidy lock code (SSDS) and to use the data configuration lock code (SSDC) instead to ensure that inadvertent access to the cellular telephone is not performed. Additionally, zeroing-out the subsidy lock code reduces the problems associated with the transfer of cellular service accounts between cellular service carriers or cellular networks ("churn"). The problems are reduced because a cellular service carrier or cellular network can simply manually zero-out the data configuration lock code 58 and reprogram. Otherwise, with a non-zero value for the subsidy lock code 56, a new cellular service carrier for the cellular telephone may have to consult with the previous cellular service provider for programming information.

Referring again to the cellular telephone 12 in FIG. 2, the memory 54 also contains a service application program 59 that may challenge a request from an entity seeking to access data of the cellular telephone or seeking to activate the cellular telephone. The service application program 59 may enable or deny a request to access data of the cellular telephone or to activate the cellular telephone 12. Unlike prior cellular telephones, the preferred embodiment includes the subsidy lock code (SSDS) 56 and the data configuration lock code (SSDC) 58 as defined in the memory 54 that may be used to limit access to data within the cellular telephone 12. When an entity attempts to activate or access data of the cellular telephone 12, the service application program 59 determines which of the codes (subsidy lock code or data configuration lock code) are to be used in a challenge to the requesting entity. The subsidy lock code (SSDS) 56 cannot be zero'd-out from the keypad of the cellular telephone 12, while the data configuration lock code (SSDC) 58 can be zero'd-out from the keypad. Consequently, the subsidy lock code 56 is more secure with respect to access to the data of the cellular telephone 12. Therefore, when both the subsidy lock code and the data configuration lock codes are present, and non-zero, a challenge from the cellular telephone is preferably performed using the subsidy lock code 56. To aid in determining whether the subsidy lock code 56 or the data configuration lock code 58 should be used in a challenge to a requesting entity, a flag or other indicator is set so as to indicate the appropriate code. For example, preferably a logical "1" or "0" may be used such that SSD_Select=1 indicates that the subsidy lock code should be used and SSD_Select=0 indicates that the data configuration lock code should be used.

Computation and Programming of a Subsidy Lock Code for a Cellular Telephone

As generally described above, to help ensure that a cellular telephone is not set-up on a non-designated cellular network and to limit access to the data of the cellular telephone, the subsidy lock code may be computed and preprogrammed into the cellular telephone at the time of manufacture or initial programming of the cellular telephone. Referring to FIG. 3, a block diagram of a computer system 40 for programming the subsidy lock code 56 into the cellular telephone 12 is illustrated. The computer system 40 may be located at a cellular telephone manufacturer 30. It should be appreciated by those skilled in the art that the programming of the subsidy lock code 56 in the cellular telephone 12 at the manufacturer is not required. However, the subsidy lock code 56 preferably should be programmed in the cellular telephone before the cellular telephone is made available for sale or operation to the general public.

In accordance with the preferred embodiment of the present invention, a subsidy lock code 56 is generated for each cellular telephone. The subsidy lock code is preferably based on the electronic serial number (ESN) 24 of the cellular telephone 12 and a carrier specific ID code 70 that uniquely identifies a specific service carrier or cellular service provider. The carrier specific ID code 70 may represent the cellular service carrier that subsidized the purchase price of the cellular telephone being programmed. The carrier specific ID code 70 may be generated as a function of other variables as well such as the ESN of the cellular telephone, the date, etc. The computer system 40 preferably contains a carrier specific application program 66a for generating the subsidy lock code 56 based on the carrier specific ID code 70 and the electronic serial number 24 of the cellular telephone. The subsidy lock code 56 may be then transmitted through data ports 60 (FIG. 2) and stored in a memory location of the cellular telephone 12 as discussed in connection with FIG. 2. If the cellular telephone manufacturer 30 provides cellular telephones for more than one cellular service carrier, then a plurality of carrier specific application programs 66b . . . 66n may be used in the computer system 40 to provide unique codes for the individual carriers.

The computer system 40 includes a central processing unit (CPU) 80 and a system memory 81 (including read only memory (ROM)) 82 and random access memory (RAM) 84), which is connected to the CPU 80 by a system bus 86. The CPU 80 serves to process the information used by the application programs 66. An operating system 85, which controls the hardware resources used in conjunction with the application program 66, is shown residing in RAM 84. A basic input/output system (BIOS) 88 for the computer system 40 is stored in ROM 82. Those skilled in the art will recognize that the basic input/output system 88 is a set of basic routines that helps to transfer information between elements within the computer system 40.

Within the computer system 40, a local hard disk drive 91 is connected to the system bus 86 via a hard disk drive interface 92. A user enters commands and information into the computer system 40 by using a keyboard 94 and/or pointing device, such as a mouse 86, which is connected to the system bus 86 via a serial port interface 98. Other types of pointing devices (not shown in FIG. 3) include track pads, track balls, and other devices suitable for inputting or selecting data in the computer system 40.

The computer system 40 may operate in a networked environment with logical connections to remote computers. The computer system 40 may be connected to a remote computer by a modem 34, which is used to communicate over telephone line 18. The modem 34 is connected to the system bus 86 via the serial port interface 98. Although modem 34 in FIG. 2 is illustrated as external to the computer system 40, those of ordinary skill in the art will recognize that the modem 34 may also be internal to the computer system 40, thus communicating directly via the system bus 86. It should be appreciated that the computer system 40 may be connected to other computer systems via a local area network and/or a wide area network. Many alternative methods exist of providing a communication path between the computer system 40 and remote computers.

Although other internal components of the computer system 40 are not shown, those of ordinary skill in the art will appreciate that such components and the interconnection between them are well known. Accordingly, additional details concerning the internal construction of the computer system 40 are not discussed in connection with the present invention.

With continuing reference to FIG. 3, the carrier specific ID code 70 and the electronic serial number 24 may be input in the computer system 40 for use in the carrier specific application program 66a by an administrator through the keyboard 94. Alternatively, the administrator may initiate a command for the computer system 40 to read the electronic serial number 24 from the cellular telephone 12 and may select the appropriate carrier specific ID code 70 from a display list of carrier specific ID codes. The carrier specific ID code 70 may be stored on hard disk drive 91. The subsidy lock code 56, generated from the carrier specific ID code 70 and the electronic serial number 24, is then transmitted via the system bus 86 through the serial port interface 98 to the data ports 60 (FIG. 2) of the cellular telephone 12. The subsidy lock code 56 is then stored in the cellular telephone 12 as discussed in connection with FIG. 2. The carrier specific application program 66a may be any type program, as known to those skilled in the art, for generating a unique number based on multiple inputs.

Although the subsidy lock code 56 is programmed into the cellular telephone 12 at the cellular telephone manufacturer 30, the subsidy lock code 56 does not have to be computed by the cellular telephone manufacturer 30. For example, referring to FIG. 3 and FIG. 4, a computer system 90 located at the base station 13 may calculate the subsidy lock code 56 in the same manner as discussed above in connection with FIG. 3. Corresponding components (indicated by a numeral and letter reference) of the computer system 90 operate in the same manner as like components of the computer system 40 of the cellular telephone manufacturer 30 discussed in connection with FIG. 3. Additionally, the computer system 90 includes a transmitter 102 and a receiver 104 for radio communication with a cellular telephone.

When the cellular telephone manufacturer 30 does not calculate the subsidy lock code 56, the cellular telephone manufacturer 30 provides the electronic serial number 24 to the computer system 90 for calculation of the subsidy lock code 56. When the electronic serial number 24 is supplied to the computer system 90 of the base station 13, the computer system 90 calculates the subsidy lock code 56 using the electronic serial number 24 and the carrier specific ID code 70. The computer system 90 transfers, via modem 36, the subsidy lock code 56 to the cellular telephone manufacturer 30 for programming in the cellular telephone 12. The computer systems 40 and 90 may communicate to each other via modems 34 and 36 or any suitable network connection, as known to those skilled in the art. Nonetheless, the benefit of the process as illustrated and explained in connection with FIG. 3 is that the cellular service carrier does not have to maintain a table or database for looking up a subsidy lock code for each applicable situation.

Preferred Process for Limiting Over-the-Air Activation of a Cellular Telephone

Referring to FIGS. 1, 2, 4, and 5, the details of the preferred process for activating a cellular telephone 12 are discussed. FIG. 5 is a flow chart that illustrates the preferred process for limiting over-the-air activation of a cellular telephone. The preferred process is entered at start step 500 and proceeds to step 502 when an unactivated cellular telephone is turned on. For example, a customer may buy a cellular telephone from a retailer and turn on the cellular telephone. In step 504, the cellular telephone monitors whether configuration data of the cellular telephone has been requested by an entity. This request is generally referred to as a configuration data request 112 as explained above in connection with FIG. 2. Configuration data is typically requested by a base station that serves the general area in which the cellular telephone was turned on, that is affiliated with a particular cellular service carrier, and that notices that a cellular telephone has been turned on and has not been activated. Alternatively, a configuration data request also may be entered by an entity through the keypad of the cellular telephone. Referring again to step 504, if no configuration data has been requested, then the cellular telephone continues to monitor whether configuration data has been requested.

If configuration data has been requested, then the cellular telephone initiates a configuration data challenge (also referred to as a configuration data response). The purpose of the configuration data challenge is to determine whether the entity requesting the configuration data is authorized to access the data of the cellular telephone, and in particular, whether the entity is authorized to activate the cellular telephone. When a request is made by an entity, the cellular telephone must determine if a security feature has been implemented with respect to accessing data or to activating the cellular telephone. A security feature may include implementation of the subsidy lock code (SSDS) 56 and/or the data configuration lock code (SSDC) 58. If a security feature in the form of the lock codes 56, 58 has been implemented, then the cellular telephone must determine which of the lock codes 56, 58 should be used for the challenge to the data request. As noted above, when both lock codes 56, 58 are implemented, then the subsidy lock code 56 as the more secure code is preferably used in the challenge to the data request. In step 508, the cellular telephone determines whether the subsidy lock code 56 has been set to zero. As explained generally above, a subsidy lock code that is set to zero preferably indicates that the subsidy lock code has not been implemented for this cellular telephone. On the other hand, a subsidy lock code that is set to something other than zero preferably indicates that the subsidy lock code feature has been implemented for this cellular telephone. Thus, if in step 508, the cellular telephone determines that the subsidy lock code has been set to zero (SSDS not implemented), then the cellular telephone proceeds to step 512.

In particular, in step 512 the cellular telephone determines whether the data configuration lock code is set to zero. As also explained generally above, when both the data configuration lock code and the subsidy lock code are set to zero, the cellular telephone does not have any security features to prevent access to data stored in the cellular telephones and the cellular telephone may be enabled for activation. Thus, if in step 512, the cellular telephone determines that the data configuration lock code is set to zero, then in step 524 the cellular telephone is enabled for activation, and in step 530 the process ends. On the other hand, a data configuration lock code that is set to something other than zero preferably indicates that security features with respect to accessing the data of the cellular telephone are present. Referring again to step 512, if the cellular telephone determines that the data configuration lock code is set to something other than zero, then in step 514 the cellular telephone sets a flag to indicate that the data configuration lock code (SSDC) is to be used in the challenge. This flag may preferably be set by SSD__Select=0. The method then proceeds to determine if the requesting party is an authorized entity as is described below in connection with steps 515 et seq.

The two immediately preceding paragraphs described the preferred process followed after a determination by the cellular telephone in step 508 that the subsidy lock code is set to zero. As noted, if a subsidy lock code is set to something other than zero, preferably the security feature provided by the subsidy lock code, as described above, has been implemented for this cellular telephone. After the determination in step 508 that the subsidy lock code does not equal zero, then in step 510 a flag is set to indicate that the subsidy lock code (SSDS) is to be used in the challenge. This flag may preferably be set by SSD__Select=1. In step 515, a check is made of the flag. If, at step 515, the flag is set to one (step 510), the subsidy lock code (SSDS) is retrieved at step 515*a* for use in challenging an entity. If, at step 515, the flag is set to zero, step 514, the data configuration lock code (SSDC) is retrieved at step 515*b* for use in challenging an entity. This paragraph and the three immediately preceding paragraphs describe the process implemented by the cellular telephone to determine whether the cellular telephone should use the subsidy lock code or the data configuration lock code when challenging the requesting party or entity.

In steps 516 et seq., the preferred process generally provides security measures with respect to the activation of the cellular telephone. From a review of the flow chart of FIG. 5 and this accompanying description, the careful reader notes that steps 516 et seq. are reached in either of two circumstances: (1) the determination in step 508 that the subsidy lock code is not equal to zero; or (2) the determination in step 512 that the data configuration lock code is not equal to zero. A non-zero value for the subsidy lock code or the data configuration lock code indicates that a requesting entity must demonstrate certain knowledge in order to gain access.

In step 516, the cellular telephone sends a configuration data challenge 114 to the entity that has requested the configuration data. Typically, this entity is a base station. In step 518, the information associated with the configuration data challenge 114 is used to calculate an authorization key (AUTH B) at the base station. This associated information may include the flag or other indicator, a random or unique number, the electronic serial number of the cellular telephone, etc. In particular and in the preferred embodiment, the computer system 90 of the base station 13 receives the configuration data challenge 114 from the cellular telephone. The computer system 90 decrypts the configuration data challenge 114 so as to determine the associated information such as the flag or other indicator, the random or unique number and the electronic serial number. The computer system 90 preferably uses an application program 77 to generate the authorization key (AUTH B) 124. If the base station is associated with the cellular service carrier that subsidized the cellular telephone, the base station uses the decrypted associated information to determine an appropriate carrier specific ID. The carrier specific ID associated with the cellular service carrier, the random number and the electronic serial number are processed by an encryption program to calculate the appropriate lock code as identified by the flag or other indicator that is included as part of the decrypted associated information. The appropriate lock code is then encrypted using the random or unique number to form the authorization key (AUTH B). After the authorization key is generated, it is transmitted to the cellular telephone.

In step 520, which may occur concurrently with the above described step 518, the cellular telephone calculates a cellular telephone authorization key (AUTH C) 126 using the same information as used in the authorized base station and in generally the same manner as the base station. In step 522, the cellular telephone compares the cellular telephone authorization key (AUTH C) 126 to the base station authorization key (AUTH B) 124. If the base station authorization key is the same as the cellular telephone authorization key, then the base station has demonstrated knowledge so as to activate the cellular telephone. In particular, by providing the cellular telephone with an authorization key that is the same as the authorization key calculated by the cellular telephone, the base station has demonstrated knowledge of the appropriate lock code of the cellular telephone. On the other hand, if the base station authorization key (AUTH B) is different from the cellular telephone authorization key (AUTH M), then the base station lacks authority to activate the cellular telephone. Without the correct lock code, the unauthorized base station cannot generate an B code that matches the AUTH C code generated by the cellular telephone.

Thus, if the result of the comparison step 522 is positive, then in step 524 the cellular telephone is enabled for activation, and in step 530 the process ends. If the result of the comparison step 522 is negative, then in step 526 the entity such as the base station is denied access to the data of the cellular telephone, and in step 528 the process ends.

In summary, the present invention provides a method of limiting access, over-the-air, to the data stored in a cellular telephone and limiting activation of a cellular telephone to a designated network. A memory location that stores a subsidy lock code is defined in a cellular telephone. The subsidy lock code is operative to limit activation, either over-the-air or manually, of the cellular telephone to a cellular network that has been identified as the network in which the cellular telephone should be activated. The subsidy lock code is defined to be unchangeable or non-erasable by programming the cellular telephone from the keypad of the cellular telephone. An entity that demonstrates knowledge of the subsidy lock code may program it to zero. Once the subsidy lock code is zero, it cannot be changed. The method of the present invention requires an entity seeking access to the data stored in the cellular telephone to demonstrate knowledge of the subsidy lock code stored in the cellular telephone. The entity may demonstrate knowledge by transmitting an authorization key to the cellular telephone that can only be generated if the entity has access to the subsidy lock code. When the entity demonstrates that it knows the subsidy lock code, the cellular telephone is enabled to be activated on the cellular network.

Advantageously, the subsidy lock code defined by the present invention limits, without the aid of a third party, activation of a cellular telephone to a selected cellular network. The present invention also prevents an interceptor of cellular telephone activation signals from obtaining information that enables the interceptor to clone the cellular telephone being activated. This prevention occurs as a result of the process of the determination of the respective authorization keys (AUTH B and AUTH C) at the entity requesting configuration data and at the cellular telephone, respectively. This prevention is further brought about by the comparison of the authorization keys at the cellular telephone.

The foregoing relates to the preferred embodiment of the present invention, and many changes may be made therein without departing from the scope of the invention as defined by the following claims.

I claim:

1. In a cellular telephone having a keypad, a controller circuit for controlling the operations of said cellular telephone, and a memory for storing data related to said operations, a method of limiting access to said data of said cellular telephone, comprising the steps of:

defining a first memory location in said cellular telephone for storing a data configuration lock code;

defining a second memory location in said cellular telephone for storing a subsidy lock code;

enabling said cellular telephone to select said data configuration lock code or said subsidy lock code;

requiring an entity seeking to access said data of said cellular telephone to demonstrate knowledge of said data configuration lock code or said subsidy lock code as selected by said cellular telephone; and upon demonstration of said knowledge, enabling activation of said cellular telephone by said entity.

2. The method of claim 1, further comprising the step of determining whether there is an indicator that said data configuration lock code or said subsidy lock code is not to be selected.

3. The method of claim 1, further comprising the step of defining a third memory location in said cellular telephone for storing a flag that indicates whether said data configuration lock code or said subsidy lock code is selected by said cellular telephone.

4. A method of limiting activation of a cellular telephone to a designated cellular network, comprising the steps of:

defining in a cellular telephone a subsidy lock code for use in activating said cellular telephone on said designated cellular network, said step of defining occurring before said cellular telephone is activated on a cellular network;

initiating procedures through an entity of said designated cellular network for activating said cellular telephone on said designated cellular network;

requiring said entity to demonstrate knowledge of said subsidy lock code in response to a challenge by said cellular telephone; and upon demonstration of knowledge of said subsidy lock code, activating said cellular telephone on said designated cellular network.

5. A method of providing a subsidy lock code in a cellular telephone, said subsidy lock code preventing unauthorized activation of said cellular telephone on a cellular network, said cellular telephone having a keypad, comprising the steps of:

determining the electronic serial number of said cellular telephone;

providing an identification code associating said cellular telephone with a selected cellular service carrier; and combining said electronic serial number and said identification code, thereby forming a subsidy lock code;

storing said subsidy lock code in said cellular telephone; and defining said subsidy lock code in a manner that prevents said subsidy lock code from being erased using said keypad of said cellular telephone, said subsidy lock code being operative to associate said cellular telephone with said selected cellular service carrier, and being operative to enable activation of said cellular telephone on said cellular network.

6. The method of claim 5, wherein said subsidy lock code is a first subsidy lock code, and further comprising the step of activating said cellular telephone on said cellular network if said first subsidy lock code corresponds to a second subsidy lock code generated by said selected cellular service carrier.

* * * * *

UNITED STATES PATENT AND TRADEMARK OFFICE
CERTIFICATE OF CORRECTION

PATENT NO.     : 6,259,908 B1
DATED          : July 10, 2001
INVENTOR(S)    : Mark Austin It is certified that error appears in the above-identified patent and that said Letters Patent is hereby corrected as shown below:

<u>Title page,</u>
Item [73], Assignee, BellSouth Intellectual Property Management Corporation, Atlanta, GA (US)
and insert in its place
-- [73]   Assignee,   BellSouth Intellectual Property Corporation, Wilmington, DE (US) --

Signed and Sealed this

Ninth Day of July, 2002

*Attest:*

*Attesting Officer*

JAMES E. ROGAN
*Director of the United States Patent and Trademark Office*